(12) United States Patent
Bottacchi et al.

(10) Patent No.: US 11,822,187 B2
(45) Date of Patent: Nov. 21, 2023

(54) LIQUID CRYSTAL DISPLAY DEVICES

(71) Applicant: Flexenable Technology Limited, Cambridge (GB)

(72) Inventors: Francesca Bottacchi, Cambridge (GB); Jan Jongman, Cambridge (GB); Jonathan Huggins, Cambridge (GB)

(73) Assignee: Flexenable Technology Limited, Cambridge (GB)

( * ) Notice: Subject to any disclaimer, the term of this patent is extended or adjusted under 35 U.S.C. 154(b) by 40 days.

(21) Appl. No.: 17/051,855

(22) PCT Filed: Apr. 30, 2019

(86) PCT No.: PCT/EP2019/061104
§ 371 (c)(1),
(2) Date: Oct. 30, 2020

(87) PCT Pub. No.: WO2019/211299
PCT Pub. Date: Nov. 7, 2019

(65) Prior Publication Data
US 2021/0109386 A1   Apr. 15, 2021

(30) Foreign Application Priority Data
May 1, 2018 (GB) ..................... 1807166

(51) Int. Cl.
*G02F 1/1339* (2006.01)
*G02F 1/1335* (2006.01)

(52) U.S. Cl.
CPC ...... *G02F 1/1339* (2013.01); *G02F 1/133528* (2013.01)

(58) Field of Classification Search
None
See application file for complete search history.

(56) References Cited

U.S. PATENT DOCUMENTS

2007/0141244 A1   6/2007  Bell et al.
2011/0096255 A1*  4/2011  Rho ................ C09K 19/0275
                                                           349/33

(Continued)

FOREIGN PATENT DOCUMENTS

JP   2018025765 A   2/2018

OTHER PUBLICATIONS

Search Report from Great Britain Patent Application No. 1807166. 2, dated Oct. 17, 2019.

(Continued)

*Primary Examiner* — Phu Vu
(74) *Attorney, Agent, or Firm* — Dergosits & Noah LLP; Todd A. Noah

(57) ABSTRACT

A technique comprising: providing on an outer side of a support film of a liquid crystal cell one or more first components having an oxygen transmission rate (OTR) at least 100,000 times lower than said support film of the liquid crystal cell; wherein the method further comprises interposing a preprepared oxygen-permeable adhesive film between said support film of the liquid crystal cell and an innermost one of said one or more first components; wherein the pre-prepared oxygen-permeable adhesive film has a thickness greater than another adhesive film provided on said outer side of said support film outside of said innermost one of said one or more first components.

20 Claims, 7 Drawing Sheets

(56) References Cited

U.S. PATENT DOCUMENTS

| | | |
|---|---|---|
| 2012/0262056 A1 | 10/2012 | Bright |
| 2017/0101553 A1 | 4/2017 | Takarada et al. |
| 2017/0334177 A1* | 11/2017 | Ueno .................. C08J 7/043 |
| 2021/0277284 A1* | 9/2021 | Everaerts ............. C09J 7/401 |

OTHER PUBLICATIONS

International Search Report and Written Opinion in International Patent Application No. PCT/EP2019/061104, dated Oct. 2, 2019.

* cited by examiner

LIQUID CRYSTAL DISPLAY DEVICES

This application is a U.S. National Phase application of International Patent Application No. PCT/EP2019/061104, filed Apr. 30, 2019, which claims priority to Great Britain Patent Application No. 1807166.2, filed May 1, 2018, the contents of which are incorporated by reference in their entireties.

Some liquid crystal display (LCD) devices include control components comprising organic semiconductors supported on plastic films, such as control components comprising an organic transistor device (such as an organic thin film transistor (OTFT) device). OTFTs comprise an organic semiconductor (such as e.g. an organic polymer or small-molecule semiconductor) for the semiconductor channels. These devices are referred to here as organic liquid crystal display (OLCD) devices, but may include one or more inorganic materials, such as e.g. one or more inorganic metal layers.

The performance of organic semiconductors has been observed to be sensitive to moisture, but OLCD devices that do not exhibit significant degradation under normal operating conditions in air have been successfully demonstrated.

The inventors for the present application have conducted research into better avoiding degradation of OLCD devices outside of normal operating conditions, in particular operating conditions comprising relatively high temperatures.

There is hereby provided a method comprising: providing on an outer side of a support film of a liquid crystal cell one or more first components having an oxygen transmission rate (OTR) at least 100,000 times lower than said support film of the liquid crystal cell; wherein the method further comprises interposing a pre-prepared oxygen-permeable adhesive film between said support film of the liquid crystal cell and an innermost one of said one or more first components; wherein the pre-prepared oxygen-permeable adhesive film has a thickness greater than another adhesive film provided on said outer side of said support film outside of said innermost one of said one or more first components.

According to one embodiment, said innermost one of said one or more first components comprises a moisture barrier film or a polarisation filter component.

According to one embodiment, the method further comprises: interposing a first pre-prepared oxygen-permeable adhesive film between a first side of a first pre-prepared polarisation filter component and a first side of a liquid crystal cell; and interposing a second oxygen-permeable pre-prepared adhesive film between a second side of the first pre-prepared polarisation filter component and a first pre-prepared moisture barrier film; wherein the thickness of the first pre-prepared adhesive film is greater than the thickness of the second pre-prepared adhesive film.

According to one embodiment, the thickness of the first pre-prepared, film is greater than the thickness of the second pre-prepared adhesive film by at least 50 microns.

According to one embodiment, the method further comprises interposing the second pre-prepared adhesive film between the first pre-prepared polarisation filter component and the first pre-prepared moisture barrier film, before interposing the first pre-prepared adhesive film between the first pre-prepared polarisation filter component and the liquid crystal cell.

According to one embodiment, the first pre-prepared adhesive film exhibits an oxygen transmission rate at least 100,000 times greater than the first polarisation filter component.

According to one embodiment, the method further comprises: interposing a third pre-prepared oxygen-permeable adhesive film between a first side of a second pre-prepared polarisation filter component and a second side of the liquid crystal cell; and interposing a fourth oxygen-permeable pre-prepared adhesive film between a second side of the second pre-prepared polarisation filter component and a second pre-prepared moisture barrier film; wherein the thickness of the third pre-prepared adhesive film is greater than the thickness of the fourth pre-prepared adhesive film.

There is also hereby provided a method of assembling a liquid crystal display device, said method comprising: interposing one or more pre-prepared, oxygenated oxygen-permeable films between a surface adhesive of a pre-prepared first polarising filter component and a control component of a liquid crystal cell and/or between a surface adhesive of a pre-prepared second polarising filter component and a counter component of the liquid crystal cell; wherein the liquid crystal cell comprises liquid crystal material contained between the control component and the counter component; the control component comprises at least an organic semiconductor layer supported on a first support film, and the counter component comprises a second support film; the first polarising filter component is on the opposite side of the control component to the liquid crystal material, and the second polarising filter component is on the opposite side of the counter component to the liquid crystal material.

According to one embodiment, the method further comprises removing a release liner of at least one of said first and second pre-prepared polarising filter components to expose said surface adhesive.

According to one embodiment, the one or more pre-prepared, oxygenated oxygen-permeable films comprise one or more pre-prepared adhesive films.

According to one embodiment, the one or more pre-prepared, oxygenated, oxygen-permeable films have a combined thickness of at least about 185 microns.

According to one embodiment, the method further comprises further encapsulating the liquid crystal cell, polarising filter components and one or more pre-prepared, oxygenated oxygen permeable films together in one or more moisture barrier films and/or layers.

According to one embodiment, the one or more pre-prepared, oxygenated, oxygen-permeable films comprise one or more pre-prepared oxygen-permeable films that have been stored in an oxygen-containing atmosphere, and wherein said interposing is done without any intermediate deoxygenating treatment.

According to one embodiment, the method further comprises baking at least the one or more pre-prepared oxygenated, oxygen-permeable films in dry air before said interposing.

According to one embodiment, the method further comprises additionally baking said liquid crystal cell and said first and second polarising filter components in dry air before said interposing.

According to one embodiment, the method further comprises substantially excluding any pockets of gas from between the liquid crystal cell and the two polarising filter components in a display area of the display device.

There is also hereby provided a display device comprising: a liquid crystal cell comprising liquid crystal material contained between a control component comprising at least an organic semiconductor layer supported on a first support film, and a counter component comprising a second support film; a first polarising filter component on the opposite side of the control component to the liquid crystal material, and a second polarising filter component on the opposite side of the counter component to the liquid crystal material; and one or more oxygen-permeable, self-supportable films having a total thickness of at least 185 microns between the first polarising filter component and the control component and/ or between the second polarising filter component and the counter component.

According to one embodiment, the one or more oxygen-permeable self-supportable films comprise one or more self-supportable adhesive films.

According to one embodiment, all of the liquid crystal cell, polarising filter components and one or more oxygen-permeable self-supportable films are wholly encapsulated by one or more moisture barrier films and/or layers.

According to one embodiment, the one or more oxygen-permeable self-supportable films have been stored in an oxygen-containing atmosphere before incorporation into the device without any intermediate deoxygenating treatment.

According to one embodiment, the device substantially excludes any pockets of gas between the liquid crystal cell and the two polarising filter components in a display area of the display device.

There is also hereby provided a method, comprising: applying one or more pre-prepared, oxygenated oxygen-permeable films to one or more sides of a liquid crystal cell comprising liquid crystal material contained between a control component comprising at least an organic semiconductor layer supported on a support film, and a counter component comprising a support film; and applying polarising filter components to both sides of the liquid crystal cell, after applying the one or more oxygen-permeable films to one or both sides of the liquid crystal cell.

According to one embodiment, the one or more pre-prepared, oxygenated, oxygen-permeable films comprise one or more pre-prepared oxygen-permeable films stored in an oxygen-containing environment, and wherein applying the one or more oxygen-permeable films to the liquid crystal cell after said storing is done in an oxygen-containing environment without first deoxygenating the one or more oxygen-permeable films.

According to one embodiment, the method further comprises: baking one or more pre-prepared, oxygen permeable films in a dry air environment to reduce the moisture content before applying the one or more oxygen-permeable films to the liquid crystal cell.

According to one embodiment, said dry air environment has a humidity of less than about 10%.

According to one embodiment, the method further comprises additionally baking the liquid crystal cell in a dry air environment before applying the one or more oxygen-permeable films to the liquid crystal cell.

There is also hereby provided a method comprising: incorporating one or more pre-prepared, oxygenated oxygen-permeable films into an organic semiconductor device for the purpose of reducing degradation of the device under storage and/or operation at a temperature of about 80° C. or higher.

Embodiments of the present invention are described hereunder with reference to the accompanying drawings, in which:—

An example embodiment is described below with reference to specific examples of materials and dimensions, but the technique is equally applicable to devices comprising other materials and of other dimensions.

Figure 1:
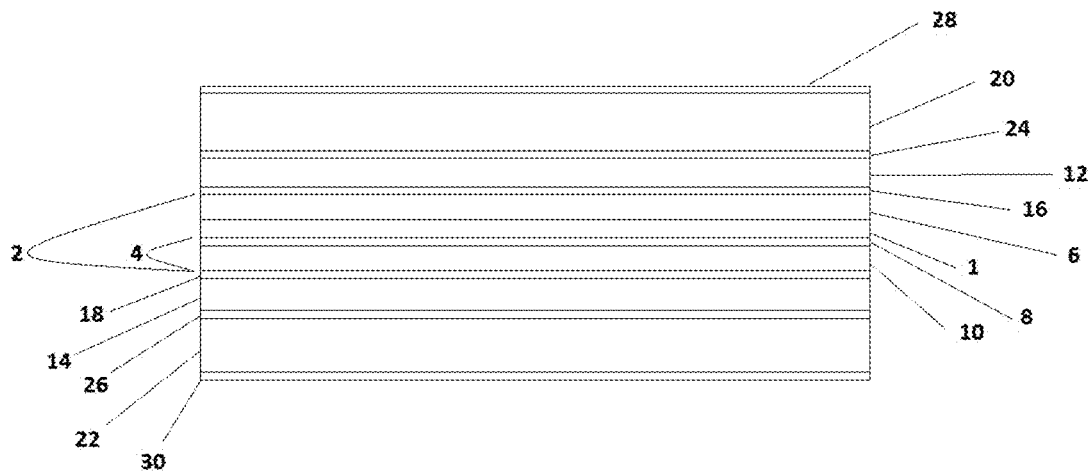
FIG. 1 illustrates a technique according town example embodiment.

With reference to FIG. 1, what is hereafter referred tows a liquid crystal cell 2 for an OLCD device comprises a liquid crystal material 1 contained between a control component 4 and a counter component 6. Spacer elements (not shown) may be used to better ensure a substantially uniform thickness of liquid crystal material over substantially the whole display area of the OLCD device. The spacer elements may be defined in the surface of the control component 4 and/or counter component 6, and/or may be separate elements such as microspheres scattered over the display area between the control component 4 and the counter component 6.

The control component 4 comprises a stack of layers 8 sequentially formed on a self-supporting plastic support film (organic polymeric support film) 10, such as a cellulose triacetate (TAC) film of a thickness of e.g. about 60 microns. The counter component 6 also comprises at least a self-supporting plastic support film, such as a TAC film of thickness of e.g. about 60 microns.

The stack of layers 8 of the control component 4 comprises conductor (e.g. metal), organic semiconductor (e.g. organic conjugated semiconductor polymer) and insulating dielectric (e.g. organic polymer dielectric) layers that together at least partially define electrical circuitry for independently controlling the optical property of pixel portions of a display area of the liquid crystal material (and thus the pattern of the optical output of the display) using electric signals applied via conductors outside the display area. In this example, one or more (patterned or unpatterned) organic semiconductor layers provide the semiconductor channels of an array of thin-film-transistors of the above-mentioned electrical circuitry; the one or more organic semiconductor layers may optionally include one or more additional materials blended with one or more organic semiconductor materials.

The OLCD device may be of a type, such as an in-plane switching (IPS) type device or fringe field switching (FFS) type device, in which both pixel and counter electrodes (between which an electrical potential difference is adjusted to control the optical property of the liquid crystal material) are included in the stack of layers 8 of the control component 4 on side of the liquid crystal material 1.

Alternatively, a counter electrode may be part of the counter component 6 (e.g. a metal layer supported on the plastic film of the counter component 6), and control of the optical property of the liquid crystal material is achieved by adjusting an electric potential difference between the pixel electrodes of the control component and the counter electrode of the counter component.

The control component 4 may also include elements having no electrical function. For example, the control component 4 may include e.g. (i) one or more layers for shielding at least the active regions of the organic semiconductor (e.g. the organic semiconductor channels of transistors defined by the stack of layers) from light generated by a backlight component, and/or (ii) one or more adhesion layers, and/or (iii) a planarization layer to provide a better surface for the above-mentioned stack of layers 8.

In this example embodiment, the liquid crystal cell 2 (including the control and counter components 4, 6) does not include any unpatterned layers/self-supporting films that function as oxygen barrier layers.

According to this first example embodiment, oxygen-permeable self-supporting plastic films 12, 14 (e.g. TAC films of thickness of about 60 microns without any hard coating) are first applied in an air environment to the inner surface (i.e. the surface that is closest to the liquid crystal cell 2 in the final assembly) of respective polariser components (polarising filter components) 20, 22 using pre-pre-pared, self-supporting oxygen-permeable optically clear adhesive (OCA) films of about 125 micron thickness 16, 18. The pre-prepared OCA films are sandwiched between release liners to protect their tackiness, and facilitate their application to another component, but the OCA films would maintain their structural integrity even in the absence of the release liners. In this example, the polariser components are also provided with at least one adhesive surface protected by a release liner, and the application of an oxygen-permeable self-supporting plastic film 12, 14 to a polariser component 20, 22 comprises: (i) removing a release liner from one side of the polariser component to expose the surface adhesive, removing a release liner from one side of the OCA film 16, 18 while retaining a release liner on the opposite side of the OCA film, and applying the side of the OCA film with release liner removed to the adhesive surface of the polariser component; (ii) removing the remaining release liner from the OCA film, and applying the plastic film 12, 14 to the OCA film. Care is taken to avoid pockets of air forming (i) between the OCA films 16, 18 and the polariser components (20, 22) and (ii) between the OCA films 16, 18 and the plastic films 12, 14. The application of any one component to another component may, for example, involve a roller lamination technique, in which two components are brought together forcibly portion-by-portion under the action of one or more lamination rollers.

The resulting polariser components 20, 22 (i.e. with the extra self-supporting plastic films 12, 14 applied to the inner surfaces thereof) are then applied in an air environment to both outer sides of the liquid crystal cell 2, again using pre-prepared oxygen-permeable optically clear adhesive (OCA) films 24, 26. In this example, the application of a polariser component 20, 22 to the liquid crystal cell 2 comprises: (i) removing a release liner from one side of an OCA film 24, 26 while retaining a release liner on the opposite side of the OCA film 24, 26, and applying the side of the OCA film release liner with release liner removed to the extra plastic film 12, 14 in situ on the polariser component; and (ii) removing the remaining release liner from the OCA film, and applying the liquid crystal cell 2 to the OCA film. Again, care is taken to avoid the formation of air pockets (i) between the extra plastic film 12,14 and the OCA film 24, 26, and (ii) between the OCA film and the liquid crystal cell 2. The application of any one component to another component may, for example, involve a roller lamination technique, in which two components are brought together forcibly portion-by-portion under the action of one or more lamination rollers.

According to one variation, the extra self-supporting plastic films 12, 14 are first applied to the liquid crystal cell 2 (via pre-prepared OCA films), before applying the polariser components 20,22 to the resulting assembly (again via pre-prepared OCA films).

Each polariser component 20, 22 comprises an active polarising film (e.g. stretched film of iodine-doped PVA) sandwiched between two plastic protection films (e.g. TAC films); and an outer surface of at least one of the plastic protection films is provided with adhesive protected by a release liner.

Pre-prepared moisture barrier films 28,30 are then applied to the outer surfaces of the resulting assembly (i.e. outer surfaces of the polariser components 20, 22).

Figure 3A:
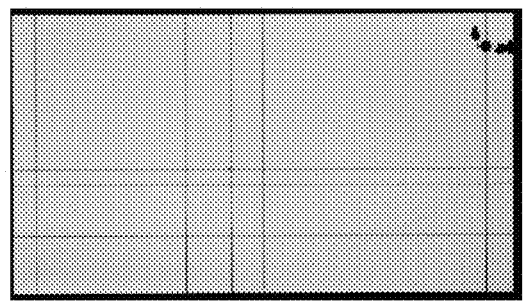
FIG. 3 shows images of the display output of a device produced according to an example embodiment before, during and after continuous storage for 10 days at 80° C.
Figure 3B:
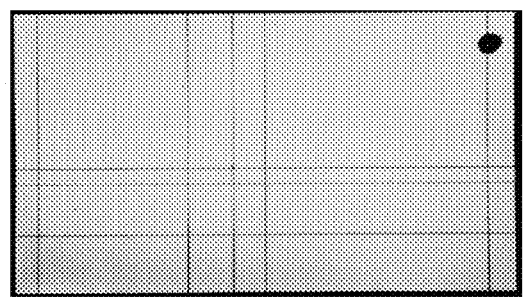
Figure 3C:

FIGS. 3a to 3c shows images of the display "all white" output (i.e. the optical output generated when driving the device with signals for producing an "all-white" output) before storage (at 80° C. (FIG. 3a), after 6 days continuous storage at 80° C. (FIG. 3b), and after 10 days continuous storage at 80° C. (FIG. 3c). There can be observed no significant blackening/greying of the kind that is attributable to a degradation of the organic semiconductor, even after 10 days continuous storage at 80° C. The black vertical and horizontal lines observed in each of the outputs are attributed to imperfections in some of the addressing conductor lines that form part of the above-mentioned control circuitry of the control component. A robust mass-production process will eliminate these imperfections. The black mark observed in the top-right corner of each of the outputs is attributed to the formation and expansion of pockets of air between the control and counter components; again a robust mass-production process will eliminate the formation of such air pockets.

Similarly good results were observed for a variation of the first example embodiment including an additional moisture/oxygen barrier film (not shown in FIG. 1) wrapped around the assembly (and one or more electrical connectors (also not shown) for connection to an external driving unit) for better encapsulation of the assembly against the ingress of moisture e.g. via the lateral edges of the assembly.

Figure 2:
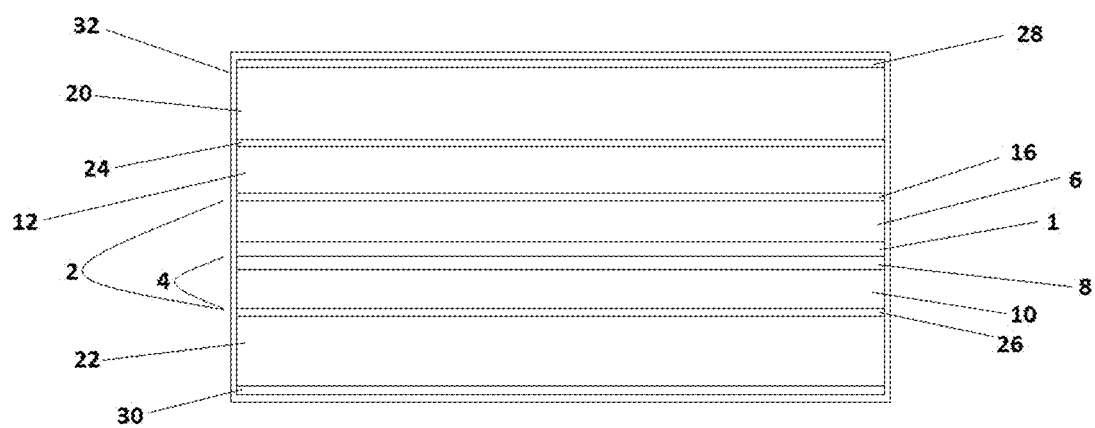
FIG. 2 illustrates a technique according to another example embodiment.

With reference to FIG. 2, a second example embodiment uses the same liquid crystal cell 2 as the first example embodiment described above. In this second example embodiment, an oxygen-permeable self-supporting plastic film 12 (e.g. TAC film of thickness of about 60 microns without any hard coating) is selectively provided on the side of the counter component 6 of the liquid crystal cell 2, again by a technique comprising: (i) removing a release liner from one side of a pre-prepared 125-micron OCA film 24 and removing a release liner from one side of a polariser component 20 to expose the adhesive surface, and applying the OCA film to the adhesive surface of the polariser component 20; (ii) removing the release liner from the other side of the OCA film 24 in situ on the polariser component 20, and applying the extra plastic film 12 to the OCA film 24; (iii) removing a release liner from one side of another pre-prepared OCA film 16 and applying the OCA film 16 to the extra plastic film 12 in situ on the polariser component 20; and (iv) removing the remaining release liner from the other side of the other OCA film 16 in situ on the extra plastic film 12, and applying the liquid crystal cell 2 to the OCA film 16. Again, care is taken not to leave pockets of air between any two components applied to one another. In this second example embodiment also, the pre-prepared OCA films each have a thickness of about 125 microns. In contrast to the first example embodiment, no extra oxygen-permeable self-supporting plastic film (or any OCA film) is applied to the control component 4 side of the liquid cell 2.

Another option for this second example embodiment is to apply the extra self-supporting plastic film 12 to the liquid crystal cell 2 (via a pre-prepared OCA film) before applying (via another pre-prepared OCA film) a polariser component to the extra self-supporting plastic film 12 in situ on the liquid crystal cell 2.

Pre-prepared moisture barrier films 28, 30 are applied to the outer surfaces of the resulting assembly (i.e. to the outer surfaces of the polariser components 20, 22), and a moisture/oxygen barrier film 32 is additionally wrapped around the resulting assembly (and one or more electrical connectors (not shown) for connection to an external driving unit) for better encapsulation of the assembly against the ingress of moisture e.g. via the lateral edges of the assembly.

Figure 4A:
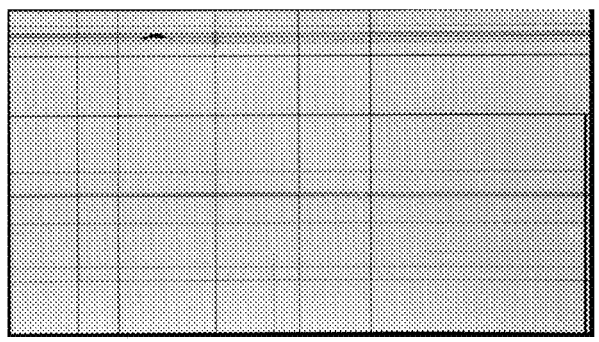
FIG. 4 shows images of the display output of another device produced according to an example embodiment before, during and after continuous storage for 8 days at 80° C.
Figure 4B:
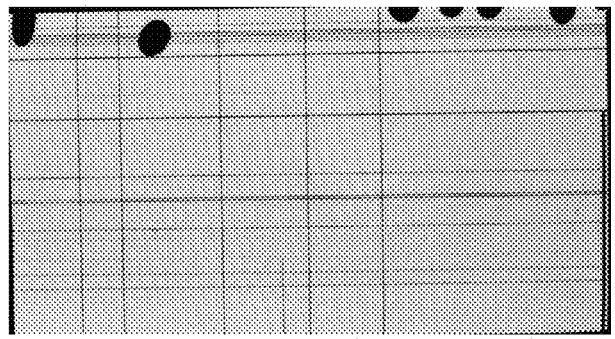
Figure 4C:
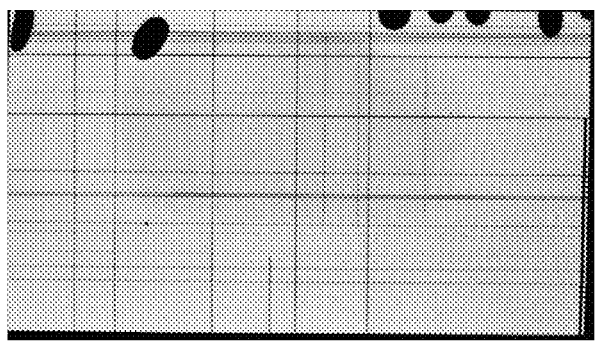

FIGS. 4a to 4c shows images of the display "all white" output (i.e. the optical output generated when driving the device with signals for producing an "all-white" output) before continuous storage at 80° C. (FIG. 4a), after 2 days continuous storage at 80° C. (FIG. 4b), and after 8 days continuous storage at 80° C. (FIG. 4c). There can be observed no significant blackening of the kind that is attributable to a degradation of the organic semiconductor, even after 8 days continuous storage at 80° C. As mentioned above, the black vertical and horizontal lines observed in the outputs are attributed to imperfections in some of the addressing conductor lines that form part of the above-mentioned control circuitry of the control component 4, and the black marks observed at the top of the outputs are attributed to the formation and expansion of pockets of air between the control and counter components 4, 6.

The examples described above use 60-micron plastic films for the extra, self-supporting plastic films 12, 14, but similarly good results have been obtained using e.g. 40-micron plastic films (e.g. 40-micron TAC films) for the self-supporting plastic films 12 and 14, and for the support films of the control component and counter component.

In both first and second example embodiments, the oxygen permeable self-supporting plastic films 12, 14 (and also OCA films 16, 18, 24, 26) between the liquid crystal cell 2 and the polariser components 20, 22 have no electrical, mechanical (structural) or optical function. Without wishing to be bound by theory, the inventors for the present application attribute the beneficial effect of the extra self-supporting plastic films 12, 14 (and the pre-prepared OCA films 16, 18, 24, 26 used to adhere the extra self-supporting plastic films to the liquid crystal cell 2 and the polariser components 20, 22) to molecular oxygen stored within the extra self-supporting plastic films 12, 14 (and within the pre-prepared OCA films that are used to adhere the extra self-supporting plastic films to the liquid crystal cell 2 and the polariser components 20, 22) that is free to diffuse to the organic semiconductor (as mentioned above, the liquid crystal cell 2 does not include any unpatterned oxygen barrier films/layers) in the control component 4 and counteract the known degrading action of moisture on organic semiconductors. The oxygen-permeable self-supporting plastic films 12, 14 and OCA films 16, 18, 24, 26 are stored in air before application to the liquid crystal cell 2 without any intermediate deoxygenating process, and are applied to the liquid crystal cell 2 in an air environment. The oxygen-permeable self-supporting plastic films 12, 14 thus remain in an aerated and oxygenated state when applied to the liquid crystal cell 2. An increased thickness for the extra oxygen-permeable plastic films 12, 14 can provide a greater positive effect on device stability in extreme conditions.

In one example variation, one or more (and preferably all) of the pre-prepared plastic films and components including pre-prepared plastic films (including the self-supporting plastic films 12, 14; the OCA films 16, 18, 24, 26 carried between release liners; the polariser components 20, 22 including plastic protection films; and the plastic support films used for the control component and counter component of the liquid crystal cell 2; and moisture barrier films 28, 30, 32) are subjected to a baking treatment (e.g. one or more days at about 80 degrees Centigrade) in dry air (humidity less than about 10%) to drive moisture out from within the plastic films; and after this baking treatment, the application of the plastic films is done in a dry air environment and/or as soon as possible after the baking treatment. Such a baking process in a dry air environment does not reduce the molecular oxygen content of the self-supporting plastic films.

A third example embodiment is the same as the second example embodiment, except that the baking process described above was employed, and the OCA film 24 between the polariser component 20 and the extra, self-supporting plastic film 12 was omitted. This third example embodiment demonstrated similarly good performance in the same extreme temperature storage test.

A fourth example embodiment is illustrated in FIGS. 5 to 12.

Figure 5:
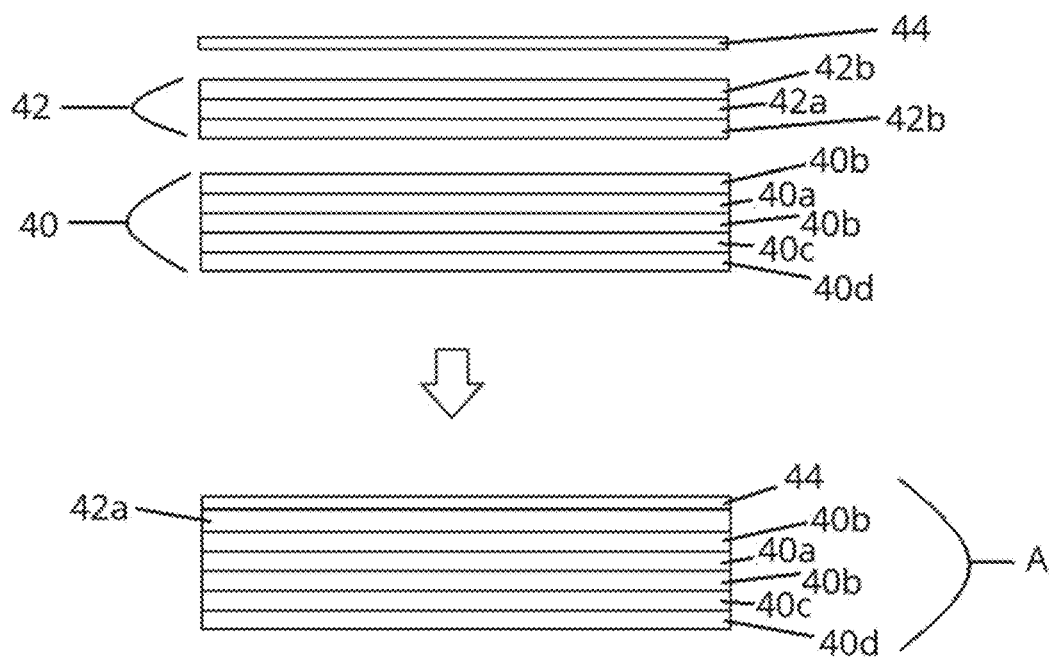
FIGS. 5 to 12 illustrate a technique according to yet another example embodiment.

With reference to FIG. 5, pre-prepared free-standing film components 40, 42 and 44 are assembled together to form a sub-assembly A. The pre-prepared free-standing film component 40 is a moisture barrier film component comprising an organic polymer support film coated with a moisture barrier material. The pre-prepared free-standing film component 42 comprises a relatively thin (see below) optically clear adhesive (OCA) organic polymer film 42a and release liners 42b to temporarily mask the tacky surfaces of the OCA film 42a. The pre-prepared free-standing film component is a polarisation filter component comprising: an active, dichroic film 40a (such as a drawn/stretched iodine-doped polymer film (e.g. iodine-doped polyvinyl alcohol (PVA) film); protective films 40b bonded to opposite sides of the active film 40a; an adhesive coating 40c on one of the protective films 40b; and a release liner 40d temporarily masking the tacky surface of the adhesive coating 40c.

Figure 6:
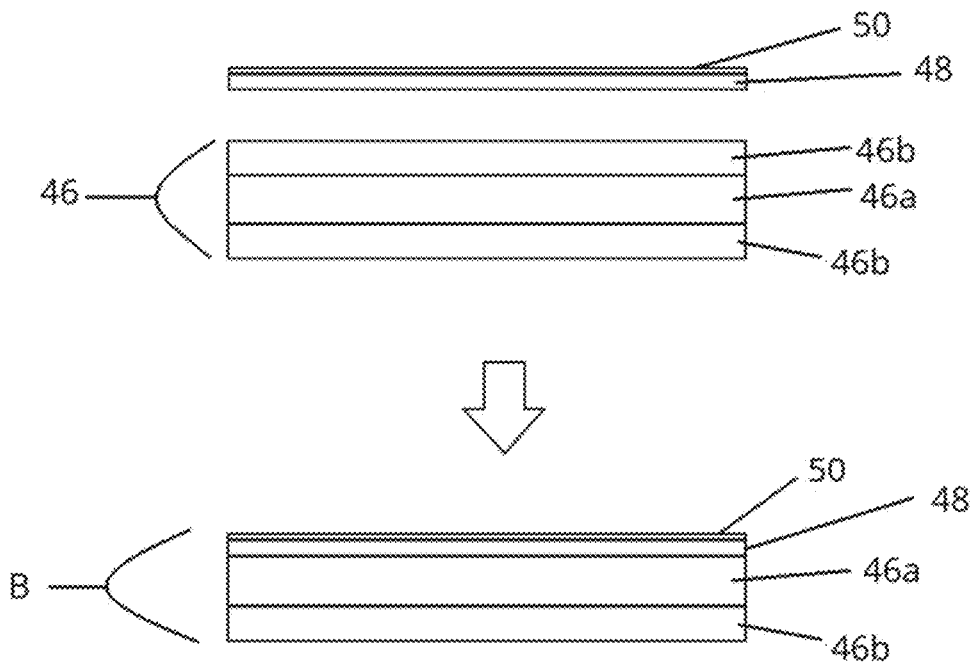

To prepare sub-assembly A: one of the release liners 42b is removed from the OCA film 42a to expose a tacky surface of the OCA film 42a, and this tacky surface is pressed against the exposed non-tacky protective film 40b of the polarisation filter component 40 to bond the OCA film 42a to the polarisation filter component 40. The remaining release liner 42b is thereafter removed from the OCA film 42a to expose the other tacky surface of the OCA film 42a, and this tacky surface is pressed against the non-tacky moisture barrier film component 44 to bond the OCA film 42a to the moisture barrier film component 44. With reference to FIG. 6, further pre-prepared free-standing film components are assembled together to form a sub-assembly B. One of the two free-standing film components comprises an optically neutral (high transmittance across the visible spectrum; non-birefringent) organic polymer film (e.g. cellulose triacetate (TAC) film) 48 coated with a substantially transparent (across the visible spectrum) conductor material 50 such as e.g. conductive indium-tin-oxide (ITO). The other of the two free-standing film components 46 comprises a relatively thick (compared to the OCA film used in sub-assembly A described above) optically clear adhesive (OCA) organic polymer film 46a and release liners 46b to temporarily mask the tacky surfaces of the thick OCA film 46a.

To prepare sub-assembly B: one of the release liners 46b is removed from the thick OCA film 46a to expose a tacky surface of the thick OCA film 46a, and this tacky surface is pressed against the non-tacky ITO-coated polymer film 48 to bond the thick OCA film 46a to the ITO-coated polymer film 48.

Figure 7:
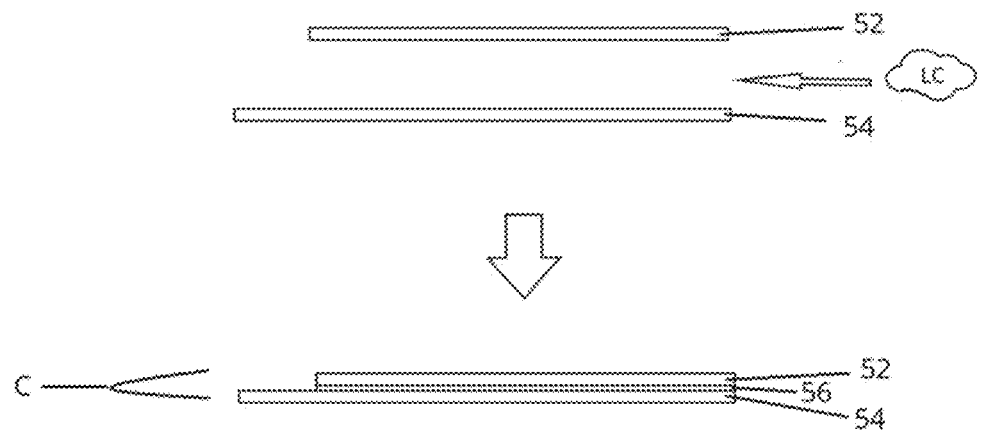

With reference to FIG. 7, an LC cell of the kind described above for preceding embodiments is prepared from a plastics film control components 52 and a plastics film counter component 54. The control component 52 comprises an optically neutral polymer film (e.g. TAC film) supporting a stack of conductor, organic semiconductor and insulating layers defining an array of pixel electrodes and organic TFT circuitry for independently addressing each pixel electrode via conductors outside the array of pixel electrodes; and the counter component 54 also comprises an optically neutral polymer film (e.g. TAC film). Both components have LC alignment coatings at opposing surfaces thereof. After assembly to produce LC cell C, the two components contain a precisely determined thickness of LC material there between, with adhesive outside the active display area to securely hold the two components together.

Figure 8:
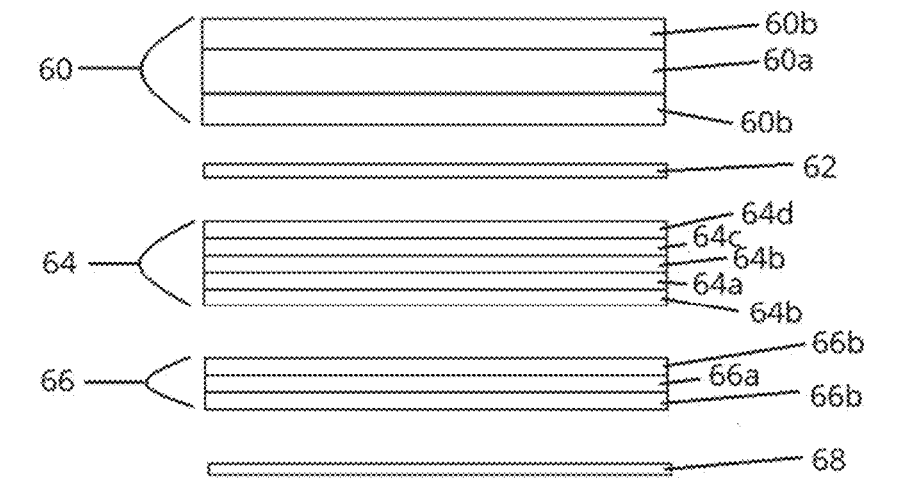
Figure 8:
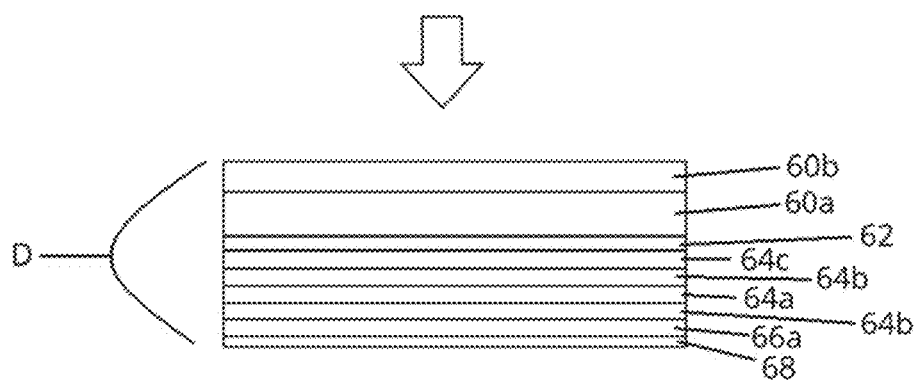

With reference to FIG. 8, further pre-prepared free-standing film components 60, 62, 64 and 66 are assembled together to form a sub-assembly A. The pre-prepared free-standing film component 68 is a moisture barrier film component comprising an organic polymer support film coated with a moisture barrier material. The pre-prepared free-standing film component 66 comprises a relatively thin (see below) optically clear adhesive (OCA) organic polymer film 66a and release liners 66b to temporarily mask the tacky surfaces of the OCA film 66a. The pre-prepared free-standing film component is a polarisation filter component comprising: an active, dichroic film 64a (such as a drawn/stretched iodine-doped polymer film (e.g. iodine-doped polyvinyl alcohol (PVA) film); protective polymer films 64b bonded to opposite sides of the active film 64a; an adhesive coating 64c on one of the protective films 64b; and a release liner 64d temporarily masking the tacky surface of the adhesive coating 64c. The pre-prepared free-standing film component comprises a free-standing cast polymer film such as a 40 micron or 60 micron thickness cellulose triacetate (TAC) film. The free-standing OCA film component 60 comprises a relatively thick (compared to the OCA film mentioned earlier in this paragraph) optically clear adhesive (OCA) organic polymer film 60a, and release liners 60b to temporarily mask the tacky surfaces of the thick OCA film 60a.

To prepare sub-assembly D: one of the release liners 66b is removed from the thin OCA film 66a to expose a tacky surface of the thin OCA film 66a, and this tacky surface is pressed against the exposed non-tacky protective film 64b of the polarisation filter component 64 to bond the thin OCA film 66a to the polarisation filter component 60. The remaining release liner 66b is thereafter removed from the thin OCA film 66a to expose the other tacky surface of the thin OCA film 66a, and this tacky surface is pressed against the non-tacky moisture barrier film component 68 to bond the thin OCA film 66a to the moisture barrier film component 68. The release liner 64d of the polarisation filter component 64 is removed to expose the tacky surface of the adhesive coating 64c of the polarisation filter component 64, and this tacky surface is pressed against the non-tacky free-standing polymer film 62 to bond the polarisation filter component 64 to the free-standing polymer film 62. One of the release liners 60b is removed from the thick OCA film 60a to expose a tacky surface of the thick OCA film 60a, and this tacky surface is pressed against the opposite non-tacky surface of the free-standing polymer 62 to bond the thick OCA film 60a to the free-standing polymer 62.

Figure 9:
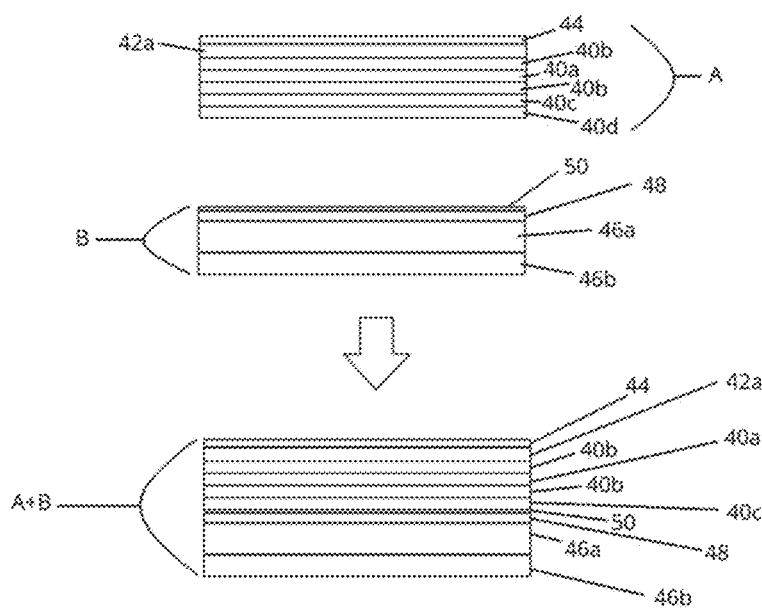

With reference to FIG. 9, the release liner 40d of polarisation filter component 40 of sub-assembly A is removed to expose the tacky surface of the adhesive coating 40c of the polarisation filter component 40; and this tacky surface is pressed against the non-tacky ITO-coated polymer film component 48/50 of sub-assembly B to bond sub-assembly A to sub-assembly B.

Figure 10:
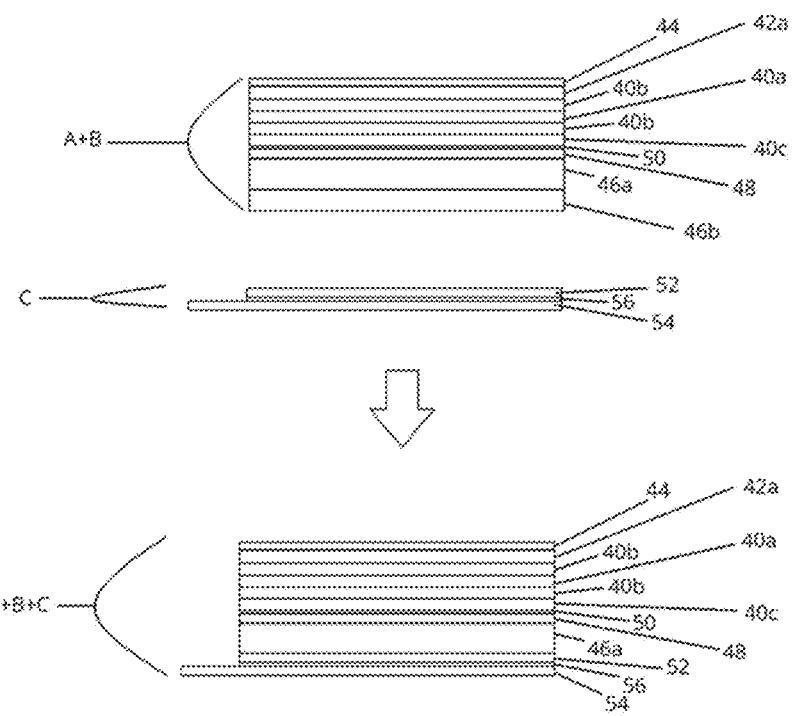

With reference to FIG. 10, the remaining release liner 46b at a surface of sub-assembly B is thereafter removed to expose the tacky surface of thick OCA film 46a of sub-assembly A+B; and this tacky surface of thick OCA film 46a is pressed against the non-tacky counter component 52 of LC cell C to bond the sub-assembly A+B to the LC cell C.

Figure 11:
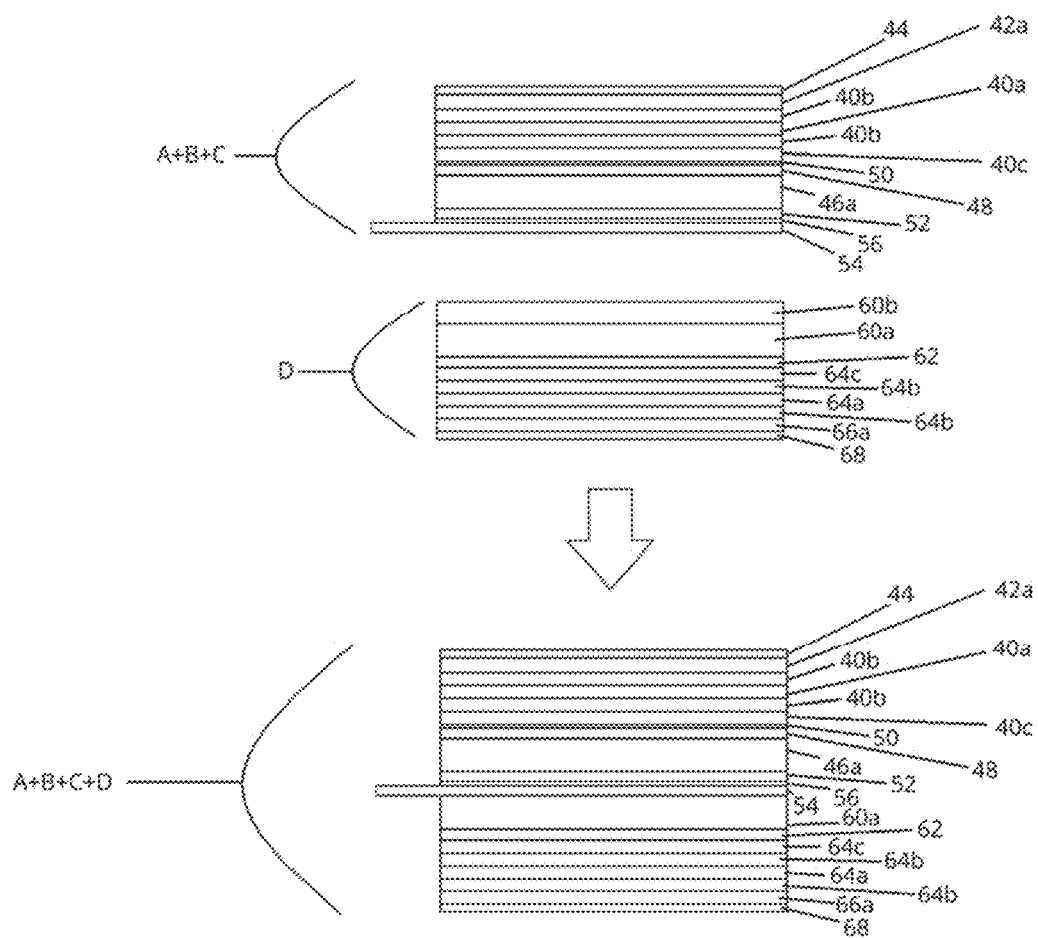

With reference to FIG. 11, the release liner 60b at a surface of sub-assembly D is removed to expose a tacky surface of the thick OCA film 60a of sub-assembly D; and this tacky surface is pressed against the non-tacky control component 54 of the LC cell C in sub-assembly A+B+C to bond sub-assembly D to sub-assembly A+B+C.

Figure 12:
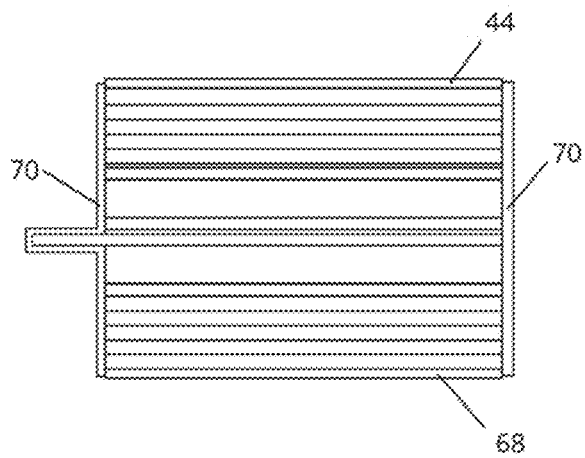

With reference to FIG. 12, a sealant 70 (adhesive with a low water vapour transmission rate after curing) is applied to the edges of the resulting assembly, and cured. This sealant and the moisture barrier films 44, 68 serve to fully encapsulate the LC against the ingress of moisture.

All polymer films between the two polarisation filter components 40, 64 (including the OCA films 46a, 60a, the polymer films used in the LC cell; and the extra polymer films 48, 62 between the two polarisation filter components 40, 64) preferably all have an oxygen transmission rate (OTR) more than at least 100,000 (one hundred thousand) times greater than the OTR of the polarisation filter components 40, 64. For example, TAC films are measured to have a OTR of about 22,800 cc/m$^2$ per day; and the polarisation filter components are measured to have an OTR of about 0.04 cc/m$^2$ per day. The moisture barrier films 44, 68 are measured to have an OTR of about 0.003 cc/m$^2$ per day. These three OTR measurements were made according to ASTM D3985, ASTM F1307 and ASTMF1927.

In the example described above: the thin OCA polymer films are acrylic films sold by the 3M Company under product code 3M™ Optically Clear Adhesive 8264, which have a thickness of 100 microns; and the thick OCA polymer films are also acrylic films sold by the 3M Company under product code 3M™ Optically Clear Adhesive 8267, which have a thickness of 175 microns. This significantly increased thickness for the OCA films 46, 60 between the low OTR polarisation filter components 40, 64 has the purpose of increasing the amount of molecular oxygen available for permeation to the organic semiconductor. The OCA films 42, 66 outside of the polarisation filter components 40, 64 are less useful for this purpose because of the low OTR of the polarisation filter components 40, 64.

3M™ Optically Clear Adhesive 8262 (acrylic, thickness 50 microns), 3M™ Optically Clear Adhesive 8264 (acrylic, thickness 100 microns) and 3M™ Optically Clear Adhesive 8146-2 (acrylic, thickness 50 microns) are examples of other suitable options for the thin OCA films 42, 66 outside of the polarisation filter components 40, 64. 3M™ Optically Clear Adhesive 8146-5 (acrylic, thickness 125 microns) is one example of another suitable option for the thick OCA films 46, 60 between the low OTR polarisation components.

The drawings show the production of a planar LCD device, but the technique is equally applicable to the production of curved LCD devices. For example: the sub-assembly may comprise an extra thin OCA film bonded to the moisture barrier film 44; and the technique may comprise bonding the sub-assemblies A, B, C and D in order to a curved cover/window component, such as a 0.3 mm-thickness acrylic curved window component.

Under testing, the display device continued to exhibit good contrast and luminance even after 300 hours at a temperature of 80° C. and a relative humidity of 10%.

In the embodiment described above, at least the thick OCA polymer films and extra polymer (e.g. TAC) films are subjected to a baking treatment (e.g. one or more days at about 80 degrees Centigrade) in dry air (humidity less than about 10%) to drive moisture out from within the polymer films; and after this baking treatment, the application of the polymer films as part of the device assembly is done in a dry air environment and/or as soon as possible after the baking treatment, and without any intermediate deoxygenating process. Vacuum drying followed by sufficient exposure to molecular oxygen in a dry air environment is another drying option for these components. As discussed above, the inclusion of molecular oxygen in (a) the polarisation filter components 40, 64 (b) the moisture barrier films 44,68 and (c) the thin OCA films 42, 66 in the example embodiment described above is considered to be less important because of the low OTR of the polarisation filter components 40, 64; and baking in dry air or vacuum drying are drying options for these components.

In one example variation, the moisture barriers are provided inside of the polariser components, but outside of the relatively thick OCA polymer films. In this variation, the moisture barriers are also non-birefringent components.

In another example variation, the polariser components 40, 64 do not comprise an adhesive coating 40c, 64c or a release liner 40d, 64d to temporarily an adhesive coating 40c, 64c; the outermost parts of the polariser components on both sides are non-tacky protective plastics film 40b, 64b protecting the active, dichroic film 40a, 64a. In this variation, the relatively thick OCA polymer films 46, 60 are bonded directly to a protective film 40b, 64b of the polariser components 40, 64.

Example embodiments are described above in the context of producing single devices, but the techniques are equally applicable to the production of multiple OLCD devices using larger area sheets of component materials etc., and then dividing the multi-device assembly into its constituent devices by cutting.

The above techniques of incorporating an oxygen-permeable self-supporting plastic film into a device for the purpose of improving stability under relatively extreme operating conditions is also applicable to other types of organic semiconductor devices for which the presence of molecular oxygen is not incompatible with the operation of the device, such as e.g. electrophoretic display devices.

As mentioned above, examples of techniques according to the present invention have been described in detail above with reference to specific process details, but the technique is more widely applicable within the general teaching of the present application. Additionally, and in accordance with the general teaching of the present invention, a technique according to the present invention may include additional process steps not described above, and/or omit some of the process steps described above.

The invention claimed is:

1. A method comprising: providing on an outer side of a support film of a liquid crystal cell one or more first components having an oxygen transmission rate (OTR) at least 100,000 times lower than the support film of the liquid crystal cell; wherein the method further comprises interposing a pre-prepared oxygen-permeable adhesive film between the support film of the liquid crystal cell and an innermost one of the one or more first components; wherein the pre-prepared oxygen-permeable adhesive film has a thickness greater than another adhesive film provided on the outer side of the support film outside of the innermost one of the one or more first components, wherein the pre-prepared oxygen-permeable adhesive film includes molecular oxygen stored therewithin.

2. The method according to claim 1, wherein the innermost one of the one or more first components comprises a moisture barrier film or a polarisation filter component.

3. The method according to claim 1, comprising: interposing a first pre-prepared oxygen-permeable adhesive film between a first side of a first pre-prepared polarisation filter component and a first side of a liquid crystal cell; and interposing a second oxygen-permeable pre-prepared adhesive film between a second side of the first pre-prepared polarisation filter component and a first pre-prepared moisture barrier film; wherein the thickness of the first pre-prepared adhesive film is greater than the thickness of the second pre-prepared adhesive film.

4. The method according to claim 3, wherein the thickness of the first pre-prepared, film is greater than the thickness of the second pre-prepared adhesive film by at least 50 microns.

5. The method according to claim 3, comprising interposing the second pre-prepared adhesive film between the first pre-prepared polarisation filter component and the first pre-prepared moisture barrier film, before interposing the first pre-prepared adhesive film between the first pre-prepared polarisation filter component and the liquid crystal cell.

6. The method according to claim 3, wherein the first pre-prepared adhesive film exhibits an oxygen transmission rate at least 100,000 times greater than the first polarisation filter component.

7. The method according to claim 3, further comprising: interposing a third pre-prepared oxygen-permeable adhesive film between a first side of a second pre-prepared polarisation filter component and a second side of the liquid crystal cell; and interposing a fourth oxygen-permeable pre-prepared adhesive film between a second side of the second pre-prepared polarisation filter component and a second pre-prepared moisture barrier film; wherein the thickness of the third pre-prepared adhesive film is greater than the thickness of the fourth pre-prepared adhesive film.

8. The method according to claim 1, comprising:
wherein the interposing the pre-prepared oxygen-permeable adhesive film between the support film of the liquid crystal cell and an innermost one of the one or more first components is done for the purpose of reducing degradation of the liquid crystal cell under storage and/or operation at a temperature of about 80° C. or higher.

9. The method according to claim 1, comprising storing the pre-prepared oxygen-permeable film in air before the interposing, and wherein the interposing is performed without subjecting the pre-prepared oxygen-permeable film to any deoxygenating process between the storing in air and the interposing.

10. The method according to claim 1, comprising: before the interposing, subjecting the pre-prepared oxygen-permeable film to a baking treatment in dry air.

11. The method according to claim 10, wherein the dry air has a humidity of less than about 10%.

12. The method according to claim 10, wherein the baking treatment is performed at about 80 degrees.

13. The method according to claim 10, wherein the baking treatment is performed for one or more days.

14. The method according to claim 1, wherein the interposing is done in a dry air environment.

15. The method according to claim 1, comprising:
before the interposing, driving moisture out from within the pre-prepared oxygen-permeable film, without reducing a molecular oxygen content of the pre-prepared oxygen-permeable film.

16. The method according to claim 1, comprising:
before the interposing, vacuum drying the pre-prepared oxygen-permeable film to prepare a vacuum-dried oxygen-permeable film, and then exposing the vacuum-dried oxygen permeable film to molecular oxygen in a dry air environment.

17. A method comprising:
providing on an outer side of a support film of a liquid crystal cell one or more first components having an oxygen transmission rate (OTR) at least 100,000 times lower than the support film of the liquid crystal cell;
wherein the method further comprises interposing a pre-prepared oxygen- permeable adhesive film between the support film of the liquid crystal cell and an innermost one of the one or more first components;
wherein the liquid crystal cell comprises an organic semiconductor providing semiconductor channels of an array of transistors; wherein the pre-prepared oxygen-permeable adhesive film includes molecular oxygen stored therewithin; and
wherein the molecular oxygen is free to diffuse to the organic semiconductor.

18. A method comprising:
providing on an outer side of a support film of a liquid crystal cell one or more first components having an oxygen transmission rate (OTR) at least 100,000 times lower than the support film of the liquid crystal cell;
wherein the method further comprises interposing a pre-prepared oxygen-permeable adhesive film between the support film of the liquid crystal cell and an innermost one of the one or more first components;
wherein the pre-prepared oxygen-permeable adhesive film has a thickness greater than another adhesive film provided on the outer side of the support film outside of the innermost one of the one or more first components;
wherein the pre-prepared oxygen-permeable film comprises a pre-prepared oxygen-permeable film that has been stored in an oxygen-containing atmosphere, and
wherein the interposing is done without any intermediate deoxygenating treatment.

19. The method according to claim 18, further comprising:
baking the pre-prepared oxygen-permeable film in dry air before the interposing.

20. The method according to claim 19, further comprising:
additionally baking the liquid crystal cell and the one more first components having an oxygen transmission rate (OTR) at least 100,000 times lower than the support film of the liquid crystal cell in dry air before the interposing.

* * * * *